Patented Feb. 15, 1949

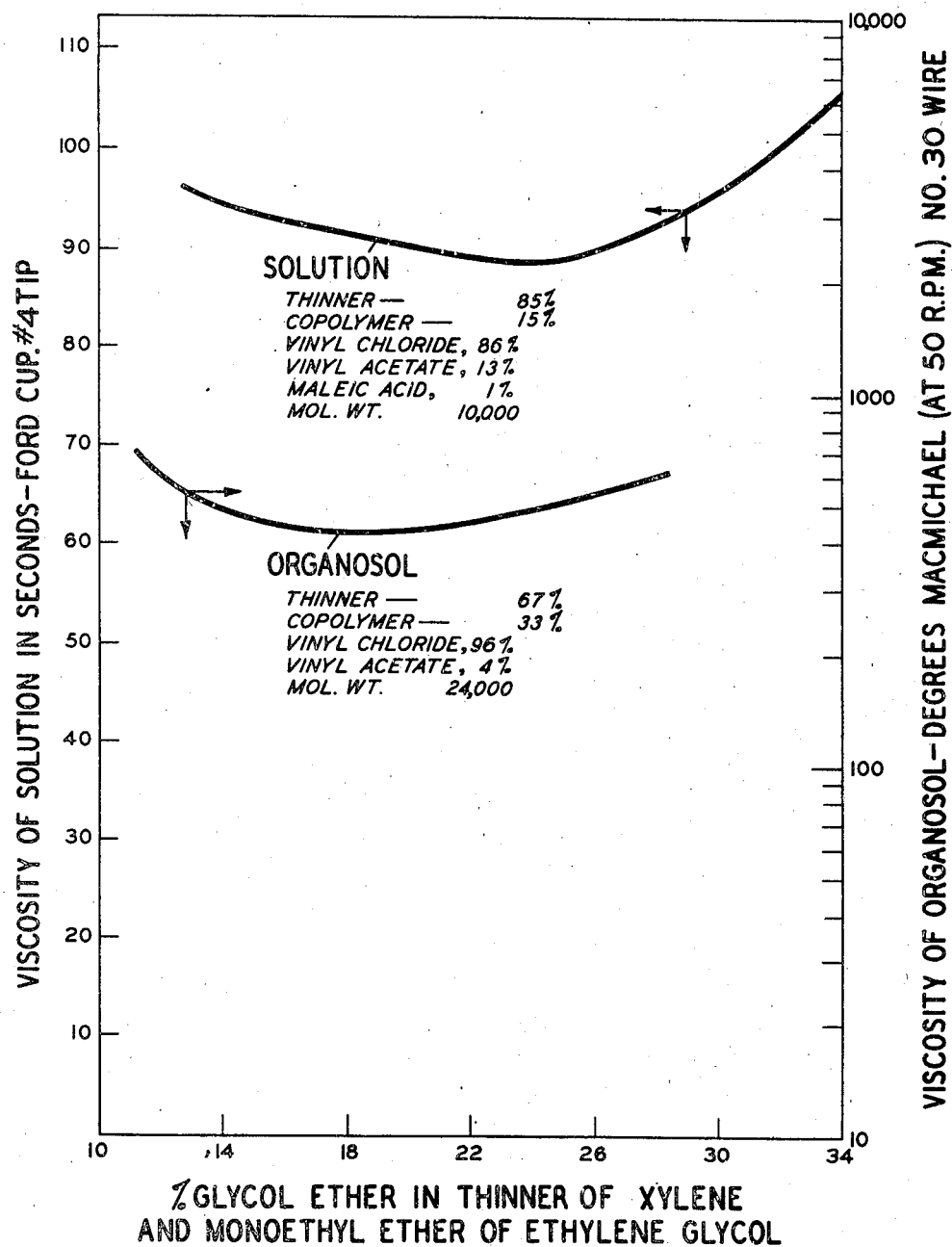

2,461,613

UNITED STATES PATENT OFFICE 2,461,613

DISPERSIONS OF VINYL CHLORIDE RESINS

Richard W. Quarles, Pittsburgh, and Clayton I. Spessard, Leechburg, Pa., assignors to Carbide and Carbon Chemicals Corporation, a corporation of New York Application July 5, 1947, Serial No. 759,200

7 Claims. (Cl. 260—33.2)

Dispersions of emulsion-polymerized relatively insoluble vinyl chloride resins of high average molecular weight, i. e. above 20,000, in dispersant-diluent mixtures have been introduced commercially under the term organosols. Usually the dispersant comprises a ketone, such as diisobutyl ketone, and the diluent, an aromatic hydrocarbon, and the mixture is formulated to be lean in ketone so that the mixture has a balanced swelling action on the relatively insoluble vinyl chloride resins. If the ketone predominates in the mixture, the organosol will tend to gel. On the other hand, solutions of vinyl chloride resins having average molecular weights below 15,000 in thinners composed of ketones and aromatic hydrocarbons must be rich in ketone to avoid excessive viscosity or gelation of the solution. Accordingly, it is difficult to blend the conventional vinyl chloride resin solutions with the newly developed vinyl chloride resin dispersions.

It has been discovered that mixtures of certain glycol ethers with liquid aromatic hydrocarbons are solvents for the lower molecular weight vinyl chloride resins and that such mixtures have the proper swelling action for the vinyl chloride resins of higher molecular weight to form stable, fluid organosols. Furthermore, the ratio of glycol ether to aromatic hydrocarbon at which fluid compositions are obtained is approximately the same for both the solutions and the organosols. This phenomenon is illustrated in the attached drawing and in the tables to follow. Consequently, it is possible to blend solutions of the lower molecular weight vinyl chloride resins with organosols containing suspended vinyl chloride resins of higher molecular weight in approximately the same mixtures of glycol ethers and aromatic hydrocarbons to obtain fluid, stable coating compositions containing both dissolved resins and suspended resin particles. Preferably, the solutions and the organosols are prepared in separate steps and then blended. The amount of the dissolved resin in the final coating composition may vary from as little as 5% by weight of the suspended resins to as much as 40%.

The final coating composition is applied to various surfaces in the same manner as are the organosols, i. e. by dipping, spreading, spraying or brushing. The coating is cured by baking the applied film at 250° F. to 400° F. for 3 to 60 minutes. The presence of the dissolved resins improves the ease with which the coating compositions may be spread over a surface and provides continuity of the applied film before baking. Whereas, films deposited from unmodified organosols tend to dry out and crack if they are not baked shortly after spreading of the film, the baking of mixtures containing dissolved resins may safely be delayed. The dissolved resins also improve the adherence of the baked film.

The suspended resins of our new coating compositions comprise finely-divided emulsion-polymerized polymers (including copolymers) of vinyl chloride containing from 90 to 100% vinyl chloride by weight and having an average molecular weight above 20,000. The copolymerized monomer may be any of the olefinic compounds, such as vinyl acetate, vinyl propionate, vinylidene chloride, methyl acrylate, propyl acrylate, vinyl fluoride, dimethyl maleate, diethyl fumurate and acrylonitrile. From 25 to 40 parts by weight of these vinyl chloride polymers are suspended in from 50 to 100 parts by weight of the mixture of glycol ethers and aromatic hydrocarbons. The dissolved resins are copolymers of lower chlorine content and molecular weight. They comprise copolymers including vinyl chloride and vinyl acetate containing from 80 to 92% vinyl chloride by weight and having an average molecular weight of from 6000 to 15000. Such copolymers may include minor amounts, i. e. up to 7%, of other copolymerized compounds, such as maleic acid, acrylic acid, methacrylic acid, monomethyl maleate, butyl acrylate and vinyl butyrate. Vinyl alcohol groups may also be introduced by partial hydrolysis of the vinyl chloride-vinyl acetate copolymers. The dissolved resins are present in the final coating composition in amounts from 2 to 10 parts by weight per 50 to 100 parts by weight of the mixture of glycol ethers and aromatic hydrocarbons. The average molecular weights of the copolymers are determined by Staudinger's method according to the technique of Douglas and Stoops (Ind. Eng. Chem., vol. 28, p. 1152, 1936).

The glycol ethers which are useful in the practice of this invention include the lower mono-alkyl ethers of ethylene and diethylene glycol, such as the methyl, ethyl, isopropyl, butyl, and 2-ethylbutyl ethers of these glycols. The liquid aromatic hydrocarbons include benzene, toluene, xylene, ethylbenzene, isopropylbenzene and their various isomers and homologs. In general, the mixture of glycol ether and liquid aromatic hydrocarbon will contain from 10 to 40% by weight of the glycol ether. The data in Table I represents the viscosities of organosols made up of suspended resin particles in various mixtures of glycol ethers with xylene. The suspended resin was an emulsion-polymerized copolymer of vinyl chloride (96%) with vinyl acetate (4%) having an average molecular weight of about 24,000. The data in Table II shows the viscosities of resin solutions in various mixtures of glycol ethers and xylene or toluene in which the dissolved resin was a copolymer of vinyl chloride (86%), vinyl acetate (13%) and maleic acid (1%) having an average molecular weight of about 10,000.

TABLE I

Viscosity of 33% (by weight) organosol suspensions in thinners of various proportions of glycol ether to xylene

| Glycol ether in thinners (percent by weight) | Glycol Eether | | | |
|---|---|---|---|---|
| | Ethylene glycol monomethyl ether [1] | Ethylene glycol monobutyl ether | Diethylene glycol monoethyl ether | Diethylene glycol monobutyl ether |
| | Viscosity—Degrees MacMichael at 50 R. P. M. (No. 30 Wire) | | | |
| 10 | 150 | | | |
| 12 | 110 | | 440 | |
| 14 | 120 | 560 | 220 | 150 |
| 18 | 160 | 140 | 105 | 45 |
| 22 | 250 | 62 | 170 | 47 |
| 26 | 440 | 44 | 340 | 54 |
| 30 | | 39 | | 63 |
| 34 | | 37 | | |

[1] Suspended resin—30 percent by weight.

TABLE II

Viscosity of resin solutions in thinners of glycol ethers and aromatic hydrocarbons

| Glycol ether in thinner (per cent by weight) | Resin—15% Toluene 85% Ethylene glycol monoethyl ether | Resin—16% Xylene 84% Ethylene glycol monomethyl ether | Resin—16% Toluene 84% Ethylene glycol monomethyl ether |
|---|---|---|---|
| | VISCOSITY—SECONDS FORD CUP #4 TIP | | |
| 15 | 62 | | |
| 20 | 61 | 76 | 63 |
| 25 | 55 | 58 | 47 |
| 30 | 62 | 55 | 48 |
| 35 | 65 | 57 | 50 |
| 40 | 71 | 52 | 66 |

In illustration of the invention, the following solutions were prepared by mixing the ingredients (in parts by weight) at 35 to 45° C. The use of these somewhat elevated temperatures speeded the dissolution and improved the clarity of the solutions.

| | A | B |
|---|---|---|
| Copolymer of vinyl chloride (87%), vinyl acetate (13%), av. mol. wt. 10,000 | 15 | 12 |
| Ethylene glycol monomethyl ether | 22 | |
| Ethylene glycol monoethyl ether | | 22 |
| Toluene | 63 | 66 |

| | C | D | E | F |
|---|---|---|---|---|
| Copolymer of vinyl chloride (86%), vinyl acetate (13%), maleic acid (1%), av. mol. wt. 10,000 | 15 | 12 | 12 | 12 |
| Ethylene glycol monomethyl ether | 22 | | 22 | |
| Ethylene glycol monoethyl ether | | 22 | | 22 |
| Toluene | 63 | 66 | | |
| Xylene | | | 66 | 66 |

| | G | H |
|---|---|---|
| Copolymers of vinyl chloride (91%), vinyl acetate (3%), vinyl alcohol (6%), av. mol. wt. 10,000 | 15 | 12 |
| Ethylene glycol monomethyl ether | 22 | |
| Ethylene glycol monoethyl ether | | 22 |
| Toluene | 63 | 66 |

These solutions may be blended with organosols of the compositions given in the drawing or in Table I. Preferably, the solutions and organosols are blended in proportions so that the final coating compositions contain one part of dissolved resin by weight for each ten parts of suspended resin by weight.

Solutions A to H may also be blended with organosols containing plasticizers for the resin, the amount of plasticizer being from 10 to 100% by weight of the suspended resin. An organosol of this type was prepared by grinding the following ingredients in a ball mill for about 40 hours:

Organosol A

Parts by weight
Emulsion—polymerized copolymer of vinyl chloride (96%), vinyl acetate (4%), av. mol. wt. about 24,000 _____ 35
Di(2-ethylhexyl) phthalate _____ 7
Ethylene glycol monoethyl ether _____ 6
Xylene _____ 52

One hundred (100) parts by weight of organosol A were mixed with 23.3 parts by weight of solution C to form a fluid, stable coating composition. This composition was applied to aluminum foil and baked for about 5 minutes at 325° F. A tough, flexible film was formed which adhered well to the metal.

The coating composition may contain pigments, waxes, and stabilizing agents such as those customarily used in vinyl resin finishes. Also a wide variety of surfaces may be covered, and the compositions are particularly useful for coating metals because of the improved adherence contributed by the dissolved resins.

We claim:
1. A coating composition comprising a suspension of from 25 to 40 parts by weight of a finely-divided emulsion-polymerized vinyl chloride polymer containing from 90 to 100% vinyl chloride by weight and having an average molecular weight above 20,000, in from 50 to 100 parts by weight of a suspension media composed of from 10 to 40% by weight of a lower monoalkyl ether containing up to six carbon atoms in the alkyl radical of a glycol from the group consisting of ethylene and diethylene glycol and from 60 to 90% by weight of a liquid aromatic hydrocarbon, said suspension media containing dissolved therein from 2 to 10 parts by weight of a copolymer including combined vinyl chloride and vinyl acetate containing from 80 to 92% vinyl chloride by weight and having an average molecular weight of from 6000 to 15000.

2. A composition as defined in claim 1 in which the suspension media contains from 10 to 30% by weight of ethylene glycol monomethyl ether.

3. A composition as defined in claim 1 in which the suspension media contains from 14 to 40% by weight of ethylene glycol monobutyl ether.

4. A composition as defined in claim 1 in which the suspension media contains from 14 to 40% by weight of diethylene glycol monobutyl ether.

5. A composition as defined in claim 1 in which the ratio of the suspended polymer to the dissolved copolymer is 10 to 1 by weight.

6. A composition as defined in claim 1 which additionally contains di(2-ethylhexyl) phthalate in an amount from 10 to 100% by weight of the suspended polymer.

7. A composition as defined in claim 1 in which the emulsion-polymerized vinyl chloride polymer is a copolymer of vinyl chloride and vinyl acetate containing from 90 to 98% by weight of vinyl chloride.

RICHARD W. QUARLES.
CLAYTON I. SPESSARD.

No references cited.